United States Patent Office 3,372,190
Patented Mar. 5, 1968

3,372,190
PROCESS FOR THE PREPARATION OF TETRA-CYCLINE HYDROCHLORIDE FROM TETRA-CYCLINE BASE
George Krsek, Los Angeles, Orville Lowe, Long Beach, and Jerome Murray, San Gabriel, Calif., assignors to Rachelle Laboratories, Inc., a corporation of California
No Drawing. Filed Oct. 23, 1964, Ser. No. 406,176
8 Claims. (Cl. 260—559)

ABSTRACT OF THE DISCLOSURE

Tetracycline hydrochloride is prepared in high yield from tetracycline base by reacting successive portions of the base in 2-isopropoxy ethanol in such a manner that the reaction mixture initially contains an excess of base over acid, and at the end of the addition, an excess of acid is added to the base. By this means virtually total reaction is ensured and degradation of the base by excess acid minimized.

---

The present invention relates to a process for the preparation of tetracycline hydrochloride from tetracycline base, and more particularly, to such a process involving the sequential partial dissolution of tetracycline base and conversion of the dissolved base to tetracycline hydrochloride.

In the following specification, all parts and percentages are given by weight unless otherwise indicated.

It is among the objects of the invention to provide a process for the preparation of tetracycline hydrochloride from tetracycline base, which results in the formation of the hydrochloride in high yield and substantially pure form.

Other objects and advantages of the invention will be apparent from a consideration of the following detailed description of preferred embodiments thereof.

In accordance with the invention, tetracycline hydrochloride is prepared from tetracycline base by reacting successive portions of the base with successive portions of a composition of hydrochloric acid in 2-isopropoxy ethanol, in the approximate overall molar proportions of from about 0.9 to 1.05 moles of hydrochloric acid and from about 6.5 to 9.5 moles of 2-isopropoxy ethanol, per mole of tetracycline base. The multi-stage reaction is carried out by reacting at least one portion of the tetracycline base with at least one solution of hydrochloric acid in 2-isopropoxy ethanol, which is more dilute than the total hydrochloric acid-2-isopropoxy ethanol composition, subsequently adding the residual portion of the hydrochloric acid-2-isopropoxy ethanol composition, which is more concentrated in hydrochloric acid than the total acid-solvent composition, to the tetracycline hydrochloride-containing reaction mixture, and reacting the residual portion of the tetracycline base with the mixture thereby produced.

The 2-isopropoxy ethanol acts as a partial solvent for the tetracycline base as well as a vehicle for the hydrochloric acid reactant. The use of an excess of such solvent, at least in the first portion of the hydrochloric acid-2-isopropoxy ethanol composition reacted with the tetracycline base, insures the presence in solution of a high concentration of tetracycline base, while providing a lower concentration of the hydrochloric acid. It has been found that when the hydrochloric acid concentration is in excess of the approximately stoichiometric amount required for reaction with the tetracycline base, deleterious degradation of the hydrochloride takes place. When, on the other hand, a hydrochloric acid-2-isopropoxy ethanol solution which is more dilute in hydrochloric acid, i.e., contains up to about 20% more of the 2-isopropoxy ethanol solvent, than the aggregate solvent-acid composition reacted (in which hydrochloric acid is incorporated in approximately stoichiometric proportions, based on the tetracycline base to be reacted), the rate of formation of the tetracycline hydrochloride is maintained at a high level, without permitting simultaneous degradation of the hydrochloride to the base.

A portion of the 2-isopropoxy ethanol is employed as a vehicle for each successive incremental portion of the hydrochloric acid reactant utilized. Moreover, since the portion of the solvent incorporated in the initial reaction mixture is insufficient to produce a workable slurry incorporating all of the tetracycline base to be reacted, and since it is important to maintain the overall reactant proportions within the range indicated above, the base, too, is added in successive incremental portions for reaction.

The process of the present invention is described more fully below in terms of the preferred mode of operation employing a sequential two-stage procedure. It will, nevertheless, be understood that the reaction may be effected by employing the sequential addition and reaction of any number of portions of such reactants. Irrespective, however, of the number of successive portions of base and acid thus reacted, the first portion of the base is reacted with a first acid-solvent solution which is more dilute in hydrochloric acid than the total acid-solvent reactant, and the final portion of the base is reacted with a final acid-solvent solution which is more concentrated in hydrochloric acid than the total acid-solvent reactant. Moreover, the aggregate amounts of the reactants are maintained in the proportion of from about 0.90 to 1.05 moles of hydrochloric acid and from about 6.5 to 9.5 moles of 2-isopropoxy ethanol per mole of tetracycline base. Use of larger proportions of the 2-isopropoxy ethanol solvent has been found to decrease the yield of tetracycline hydrochloride, whereas the use of smaller proportions of such solvent results in decreased product purity. On the other hand, we have found that the use of higher proportions of the acid reactant results in increased degradation of the desride hydrochloride, whereas smaller proportions of the acid are insufficient to effect conversion of the tetracycline base.

Tetracycline base produced in any desired manner, e.g., by fermentation or dechlorination, may be converted, in accordance with the invention, to the desired tetracycline hydrochloride. Preferably, the tetracycline base is prepared in accordance with the fermentation procedure described more fully in copending application Ser. No. 406,170, filed Oct. 23, 1964, assigned to the assignee of the present invention and entitled "Fermentation Process for the Preparation of Tetracycline Antibiotics."

As indicated hereinabove, the tetracycline base is reacted portion-wise with successive portions of a hydrochloric acid-2-isopropoxy ethanol composition, in the overall molar proportion of from about 0.9 to about 1.05 moles hydrochloric acid and from about 6.5 to 9.5 moles of 2-isopropoxy ethanol per mole of the tetracycline base. Preferably, from about 20 to 95%, desirably 75%, of the hydrochloric acid so utilized is initially dissolved in from 40 to 95%, desirably 90%, of the 2-isopropoxy ethanol and the resulting solution charged to a non-reactive agitated crystallizer tank and cooled to a temperature of from about 10° to 20° C. From about 20 to 95%, desirably 75%, of the tetracycline base is then added to the hydrochloric acid-containing solution over a period of from about 1 to 3 hours to effect the first phase of the reaction, cooling being employed, if necessary, to maintain the temperature of the reaction mixture within the range of from about 10° to 30° C.

The remaining approximately 5 to 80%, desirably 25%, of the hydrochloric acid dissolved in the remaining approximately 5 to 60%, desirably 10%, of the 2-isopropoxy ethanol are thereafter mixed, cooled to a temperature within the range of from about 10° to 20° C. and added to the mixture in the reaction vessel. Finally, the remaining approximately 5 to 80%, desirably 25%, of the tetracycline base is added to the reaction mixture to effect the second phase of the reaction.

The tetracycline hydrochloride-containing reaction mixture thus produced is maintained at temperatures within the range of from about 23° to 31° C., the acidity being adjusted, if necessary, by the addition of a further solvent-acid mixture (suitably containing from about 3 to 6 parts by volume of 2-isopropoxy ethanol per part hydrochloric acid) to a pH value within the range of from about 1.5 to 1.6. Tetracycline hydrochloride is thus precipitated from the mixture, and may be conveniently separated by centrifugation or filtration. The hydrochloride is then washed, suitably with successive fractions of 2-isopropoxy ethanol, isopropanol or butanol and acetone, and the washed product dried and packaged.

The following examples illustrate preferred embodiments of the process of the present invention. It will be understood that the invention is not limited thereto.

Example 1

Tetracycline base was produced in the manner described in the example appearing in the aforesaid copending application Ser. No. 406,170, filed Oct. 23, 1964. The dry tetracycline base thus produced was oscillated through a 100-mesh screen and weighed. Per kilogram of the dry base, about 82 grams hydrochloric acid (1:1 molar ratio), dissolved in 2-isopropoxy ethanol (commercially available from Union Carbide Co. under the trade designation isopropyl Cellosolve) was reacted in the following manner to convert the base to the desired tetracycline hydrochloride:

Initially, 61.5 kg. (75%) of the hydrochloric acid dissolved in 1.8 l. of the 2-isopropoxy ethanol were charged to a nonreactive, agitated crystallizer tank and the mixture cooled. 750 grams (75%) of the finely powdered tetracycline base were thereafter added to the cooled solvent-acid mixture over a period of approximately 1 to 3 hours, while maintaining the temperature of the mixture within the range of from 10° to 20° C.

The remaining hydrochloric acid dissolved in the remaining 0.2 l. (10%) of the 2-isopropoxy ethanol were mixed, cooled to between 10° and 20° C. and added to the reaction mixture in the crystallizer.

The remaining 250 grams (25%) of the powdered tetracycline base was then added to the reaction mixture, and the temperature maintained at between 23° and 31° C. with cooling. The mixture was agitated for a period of 20 hours and sufficient HCl-2-isopropoxy ethanol solution (1 part HCl per 4 parts of the 2-isopropoxy ethanol by volume) was added to maintain the pH of the mixture within the range of from 1.5 to 1.6.

The product slurry was centrifuged and the crystalline tetracycline hydrochloride separated and successively washed with 2-isopropoxy ethanol, isopropanol, and acetone. The pure tetracycline hydrochloride was produced in an amount of 160 kg., equalling a product yield of about 90%, based upon the theoretical hydrochloride production.

Example 2

153 kg. of the tetracycline base prepared as described in Example 1 was passed through a 100-mesh screen on an oscillator. 20 l. hydrochloric acid were separately added to 307 l. of 2-isopropoxy ethanol and chilled, with agitation, to a temperature of about 15° C. 115 kg. of the tetracycline base was slowly added to the hydrochloric acid-2-isopropoxy ethanol mixture in a crystallizer tank with agitation. The base was added over a period of approximately one hour while maintaining the temperature of the reaction mixture at about 15° C.

8 l. of hydrochloric acid were admixed with 30 l. of 2-isopropoxy ethanol, agitated and cooled to 15° C. The resulting acid-solvent mixture was added to the reaction mixture in the crystallizer with continued agitation. An additional 38 kg. of the tetracycline base was added to the resulting reaction mixture over a period of approximately 20 minutes, the temperature of the mixture being maintained within the range of from about 15° to 30° C.

3.5 l. of a further mixture of hydrochloric acid in 2-isopropoxy ethanol (in a 1:4 volumetric ratio) was added to the reaction mixture over a period of sixteen hours to adjust the pH thereof to a value of 1.6. The tetracycline hydrochloride was thus precipitated from the reaction mixture, and removed by centrifugation. The product crystals were washed, first with 20 gallons of 2-isopropoxy ethanol, and then with 25 gallons of isopropanol. The remaining crystalline product was dried at approximately 110° F. 160 kg. of tetracycline hydrochloride was thus produced, a yield of 91% based upon the theoretical conversion of the base to the hydrochloride.

For comparison, a further portion of tetracycline base was converted to the hydrochloride by reaction with the hydrochloric acid in 2-isopropoxy ethanol without, however, effecting the reaction in successive stages in accordance with the present invention. The reaction was carried out by adding 217 kg. of the tetracycline base, which had been passed through a 100-mesh screen on an oscillator, to a solution containing 43 l. hydrochloric acid in 433 l. of 2-isopropoxy ethanol. The pH of the resulting mixture was about 1.6. After maintaining the reaction mixture between 15° and 30° C. for a period of 24 hours with agitation, the tetracycline hydrochloride precipitated was separated by centrifugation. The product crystals were washed successively with 2-isopropoxy ethanol and isopropanol.

The resulting product was dried at about 110° C. to constant weight. 169 kg. of tetracycline hydrochloride was thus produced, representing a yield of 72% based upon the theoretical conversion of the base to the hydrochloride.

For further comparison, tetracycline hydrochloride was prepared by reaction of the base with hydrochloric acid in ethylene glycol monoethyl ether (commercially available from Union Carbide as ethyl Cellosolve), a homolog of 2-isopropoxy ethanol.

100 grams of the tetracycline base were added to 250 cc. of the ethylene glycol monoethyl ether, diatomaceous earth added and the mixture filtered. To the resulting filtrate was added a mixture of 120 cc. butanol and 18.5 cc. hydrochloric acid (an amount of hydrochloric acid 10% in excess of the stoichiometric amount required for reaction with the tetracycline base). After maintaining the reaction mixture with agitation for a period of 48 hours the acidity of the reaction mixture was adjusted to between 1.5 and 1.6 with hydrochloric acid, the product tetracycline hydrochloride precipitating therefrom. The product crystals were separated, washed and dried in the manner indicated hereinabove. 65 grams of the tetracycline hydrochloride were thus produced, representing a yield of approximately 60%, based upon the theoretical conversion of the base to the hydrochloride.

It will thus be noted that by reacting sequential portions of a hydrochloric acid-2-isopropoxy ethanol composition with successive portions of a tetracycline base, in the manner indicated hereinabove, improved yields of tetracycline hydrochloride are produced, as compared with similar procedures in which the reaction is carried out en masse or in the presence of other reaction media.

It will be understood that various modifications may be made in the preferred procedure described hereinabove, without departing from the scope of the present invention. It is, therefore, intended that all matter contained in the preceding description shall be interpreted as illustrative and not in a limiting sense.

The embodiments of the invention in which an exclusive privilege or property is claimed are defined as follows:

1. A process for the conversion of tetracycline base to tetracycline hydrochloride, which comprises reacting the base with a composition of hydrochloric acid in 2-isopropoxy ethanol, in the proportions of from 0.9 to 1.05 moles of hydrochloric acid and from 6.5 to 9.5 moles of 2-isopropoxy ethanol per mole of tetracycline base, by successively:
   (a) reacting at least one portion of the base with at least one solution of hydrochloric acid in 2-isopropoxy ethanol, which is more dilute in hydrochloric acid than the total hydrochloric acid-2-isopropoxy ethanol composition;
   (b) adding the residual portion of the hydrochloric acid-2-isopropoxy ethanol composition, which is more concentrated in hydrochloric acid than said total composition, to the tetracycline hydrochloride-containing reaction mixture; and
   (c) reacting the residual portion of the tetracycline base with the mixture produced in step (b); and
   (d) separating the tetracycline hydrochloride from the product mixture thus obtained.

2. The process as defined in claim 1, in which the solution of hydrochloric acid in 2-isopropoxy ethanol reacted in step (a) contains 2-isopropoxy ethanol in an amount up to 20% in excess of the proportion of such material in said total composition.

3. The process as defined in claim 1, in which the hydrochloric acid-2-isopropoxy ethanol composition is reacted with the tetracycline base in a sequential two-stage procedure consisting of steps (a) and (c) thereof.

4. A process for the conversion of tetracycline base to tetracycline hydrochloride, which comprises reacting the base with a composition of hydrochloric acid in 2-isopropoxy ethanol, in the proportions of from 0.9 to 1.05 moles of hydrochloric acid and from 6.5 to 9.5 moles of 2-isopropoxy ethanol per mole of tetracycline base, by successively:
   (a) reacting from 20 to 95% of the base so reacted with a solution of hydrochloric acid in 2-isopropoxy ethanol in an amount of from 20 to 95% of the hydrochloric acid reacted in from 40 to 95% of the 2-isopropoxy ethanol reacted, while maintaining the temperature of the reacting mixture within the range of from 10° to 20° C.;
   (b) adding the residual 5 to 80% of the hydrochloric acid reacted in the residual 5 to 60% of the 2-isopropoxy ethanol reacted, to the reaction mixture produced in step (a);
   (c) reacting the residual 5 to 80% of the tetracycline base reacted with the mixture while maintaining the temperature of the reacting mixture within the range of from 23° to 31° C.; produced in step (b); and
   (d) adjusting the acidity of the product mixture produced in step (c) to pH 1.5 to 1.6 to precipitate tetracycline hydrochloride from the mixture; and
   (e) separating the product tetracycline hydrochloride.

5. The process as defined in claim 4, in which the hydrochloric acid-2-isopropoxy ethanol solution reacted in step (a) is pre-cooled to a temperature within the range of from 10° to 30° C.

6. The process as defined in claim 4, in which the hydrochloric acid-2-isopropoxy ethanol solution added in step (b) is pre-cooled to a temperature within the range of from 10° to 20° C.

7. The process as defined in claim 4, in which the acidity of the product mixture is adjusted in step (d) by adding a solution of hydrochloric acid in 2-isopropoxy ethanol solvent in the proportion of 1 part of the acid in from 3 to 4 parts of the solvents, by volume.

8. The process as defined in claim 4, in which 75% of the base is reacted in step (a) with a solution of 75% of the hydrochloric acid in 90% of the 2-isopropoxy ethanol.

References Cited
UNITED STATES PATENTS 2,992,274   7/1961   Bernardi _____ 260—559

NICHOLAS S. RIZZO, *Primary Examiner.*